Figure 1:
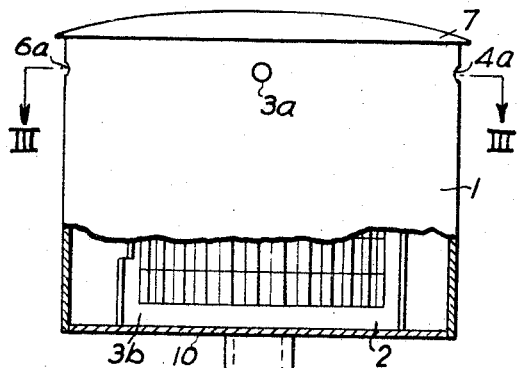

Sept. 28, 1965  F. H. PAVRY ETAL  3,209,148
RECORDING DIRECTION FINDER FOR BURSTS OF RADIATION
Filed June 23, 1955  3 Sheets-Sheet 1

INVENTORS
Francis Hilary Pavry
& Philip Henry Wagner
BY
ATTORNEY

Sept. 28, 1965  F. H. PAVRY ETAL  3,209,148
RECORDING DIRECTION FINDER FOR BURSTS OF RADIATION
Filed June 23, 1955  3 Sheets-Sheet 2

INVENTORS
Francis Hilary Pavry
& Philip Henry Wagner
BY
ATTORNEY

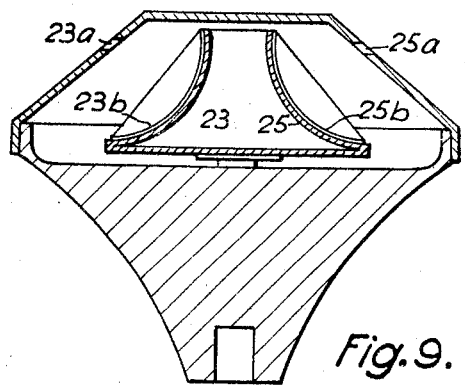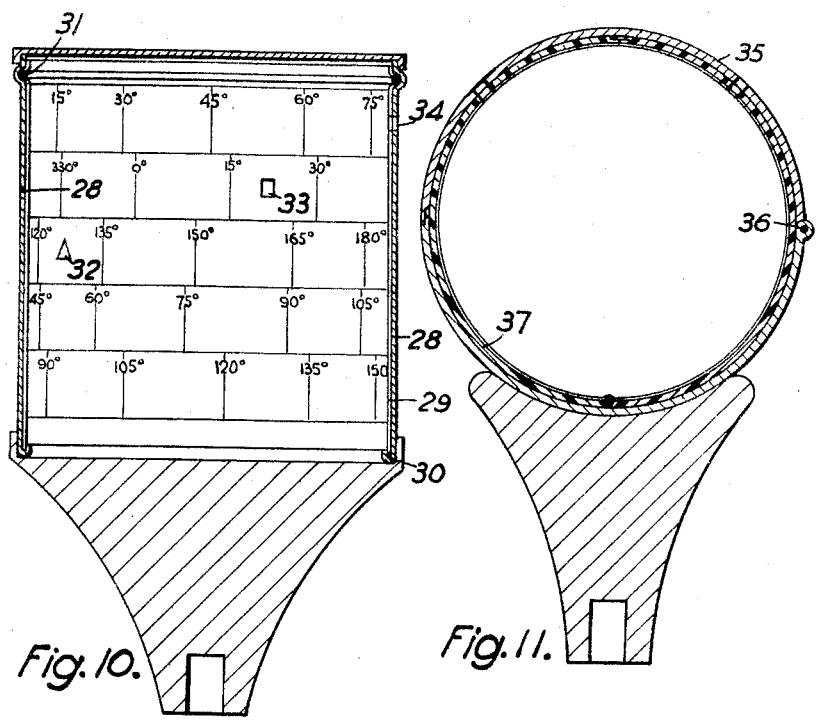

United States Patent Office 3,209,148
Patented Sept. 28, 1965

3,209,148
RECORDING DIRECTION FINDER FOR
BURSTS OF RADIATION
Francis Hilary Pavry, The Home Office, Whitehall, London, England, and Philip Henry Wagner, 15–18 Clipstone St., Great Portland St., London, England
Filed June 23, 1955, Ser. No. 517,613
9 Claims. (Cl. 250—65)

It is important that helpers and others at a distance should know as quickly and accurately as possible the location at which an atomic bomb is exploded.

Such an explosion is accompanied by a burst of very short wave electromagnetic radiation, that is to say of light and heat. The present invention is a device for finding and recording the direction from which such radiation arrives at a point of observation, and thereby ascertaining one line upon which the location of the explosion lies. The records of two such devices spaced apart in known relative positions suffice to determine the location completely. The records of a greater number of such devices will add to the accuracy of the determination of location.

The radiation may arrive from any direction in azimuth. It is likely to arrive nearly horizontally, but information as to the direction of arrival in altitude may be of value.

The invention rests on the notion of allowing a narrow beam of the radiation to affect a sensitised screen. This involves wholly enclosing the screen in an opaque container, so shaping the screen that it faces in all directions in azimuth, that is to say making its cross-section a closed figure, and providing such number of openings in the container opposite the screen, spaced in azimuth around it and each admitting radiation from a limited range in azimuth, that the range of each opening overlaps the ranges of admission of neighbouring openings.

In each opening there may be a lens in which case the lens and its diaphragms will determine the angle within which incident radiation must fall if it is to pass through the lens. But the area over which any one recording direction finder can watch is limited by reason of its being restricted to the optical range, which will usually be small even though the finder be sited, as it should be, at the greatest convenient elevation and with the least obstructed field of view, and by reason of the necessarily limited sensitivity of the screen. Therefore many finders are needed and they should be inexpensive. For this reason and because the finder may make use of either light or heat, a simple opening in the container is preferable to a lens. The opening may be a vertical slit; but if information as to altitude is to be recorded it is better that it should be a pinhole or somewhat larger hole, say 3 mm. in diameter. The angular range over which radiation is admitted will depend on the width of the opening and the thickness of the container material, or on the bore and length of a tubular nipple inserted in a perforation in the container.

In order that records thus made may be capable of unique interpretation it is necessary that the sensitised screen shall be uniquely oriented in azimuth with respect to the container and that the container itself shall be of distinguishable orientation, that is to say shall have a distinct shape or distinctive marking upon it by the aid of which it may be set up in a definite orientation.

The sensitised screen must also have reference marks upon it by the aid of which its record may be interpreted. It may bear parallel lines, running vertically, marked to indicate the bearing from which the radiation producing the record arrived. There may also be parallel lines running horizontally to afford an indication of altitude. Alternatively such a grid of vertical and horizontal lines or of vertical lines alone may be imprinted on a transparent scale, which by the aid of reference marks on the sensitised screen may be correctly placed upon the screen when removed from the container to enable its record to be interpreted.

Examples of construction of the invention are illustrated in the accompanying drawings.

Figure 2:
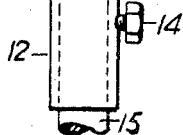
Figure 3:
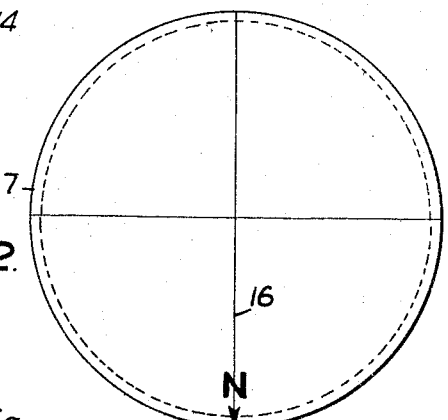
Figure 3:
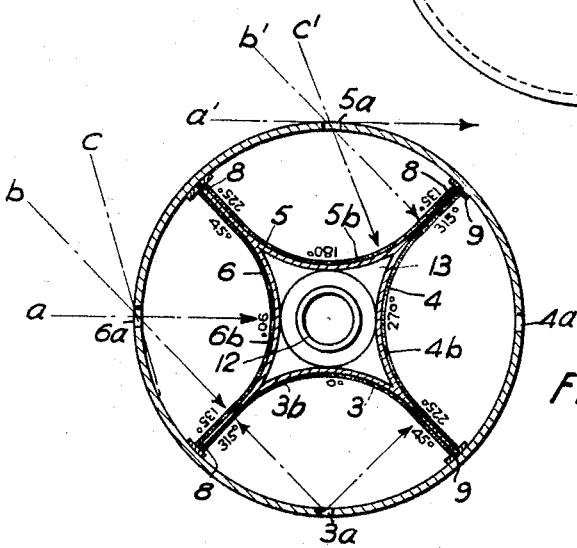
Figure 5:
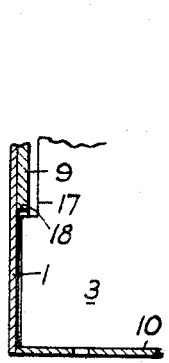
Figure 4:
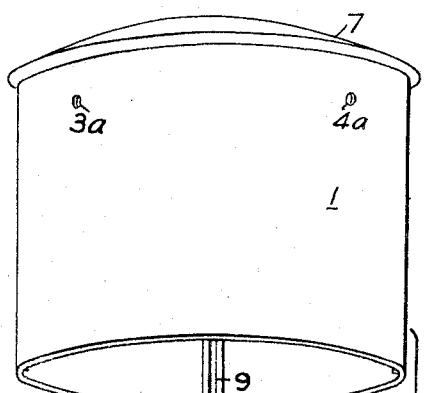
Figure 6:
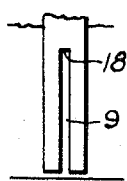
Figure 7:
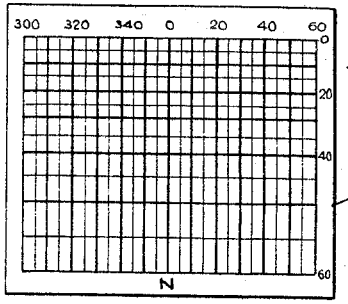
Figure 8:
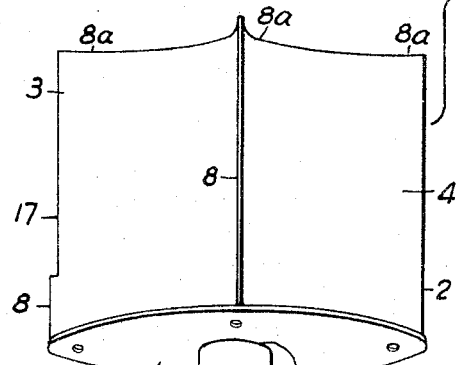
Figure 8:
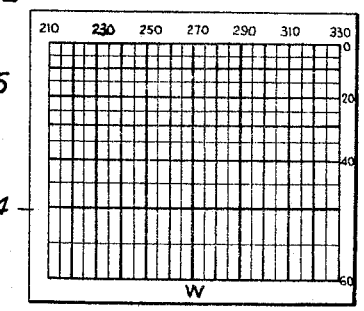

FIGURE 1 is an elevation of a recording direction finder with a part of its casing broken away;
FIGURE 2 is a plan view of it;
FIGURE 3 is a plan in section on the line III—III of FIGURE 1;
FIGURE 4 is an exploded perspective view;
FIGURES 5 and 6 are enlarged fragmentary views of details;
FIGURES 7 and 8 are developed views of two of the scales employed in the device;
FIGURE 9 is a sectional elevation of a modification of the device shown in FIGURES 1 to 6;
FIGURES 10 and 11 are sectional elevations of simpler constructions.

Referring firstly to FIGURES 1–3, the recording direction finder shown comprises a hollow cylindrical casing 1, of stout sheet metal which encloses a sensitised screen assembly 2 formed by four screens 3, 4, 5 and 6. The casing 1 is closed at its top end by a domed plate 7. In its vertical wall are four holes 3a, 4a, 5a, and 6a conveniently of 3 mm. diameter spaced 90° apart opposite the respective screens 3, 4, 5, 6. Through any one, or two, of these holes radiation emitted from an explosion may fall upon the opposite screen or on adjacent screens.

The four screens 3, 4, 5 and 6 are segments of vertical cylinders the axes of which pass diametrally through the respective holes 3a, 4a, 5a, 6a. On the concave face of each of the screens 3, 4, 5, 6 is stamped, inscribed or supported as a separate element, a scale of the form shown developed in FIGURES 7 and 8.

Neighbouring screens meet and are joined at their longitudinal edges 8. As shown in FIGURE 3, the joined edges are extended radially to substantially the radius of the casing 1. On the inner surface of the casing are formed grooved guideways 9 in which the radial extensions of the screens engage. The assembly of recording screens is supported at its lower end by a sheet metal disc 10 having a central aperture 11 for the reception of a hollow mounting sleeve 12. The latter extends within the space 13 between the rear convex surfaces of the screens (FIGURE 3) and is welded (FIGURE 4) to the sheet metal disc 10 around the aperture 11.

A clamping screw 14 serves to secure the device to a mounting rod 15.

The screens 3–6 may preferably be rendered sensitive to radiation by removably attaching to them sheets of sensitised paper, indicated at 3b–6b. The scales are graduated, preferably so that the direction of arrival of radiation which has recorded an indication may be read directly from them; that is to say if a radial line from the middle of a scale to the pinhole opposite it is directed to the north, then the mid vertical line of the scale will be marked N, or 0°, preferably with an indication whether true north or magnetic north is intended. Such a scale is shown in FIG. 7; similarly the scale facing west has its mid line marked W or 270° as shown in FIGURE 8; and so for the remaining scales.

When these scales have been affixed it is necessary that the screen assembly should be secured in the container in a unique relation in azimuth. To this end one of the grooved guide ways 9 is grooved for only a part of its length at its lower end, say from 18 downward in FIGS. 5 and 6; and one of the radial extensions which is to enter this guideway is cut back as indicated at 17 in FIG. 5 from the level of 18 upward.

It is also necessary that the mounting of the device shall be accurate in azimuth, and to this end it should be distinctively shaped or marked so as to be of distinguishable orientation. FIG. 2 shows the domed cover plate 7 inscribed with an arrow 16 and an adjacent letter N.

The scales may also bear indications of altitude, that is to say of the vertical angle at which the radiation is received. Such graduations are shown in FIGURES 7 and 8. A line on the same horizontal level as the pinholes 3a–6a is marked 0°, and this may be at or near the top of the scale, since the location of the recording direction finder can rarely be much above the level of a burst. This scale will not be evenly spaced; the spacing of its graduations will be proportional to the tangent of the angle of elevation. In this case the scale must be uniquely located in height relatively to the container; this can sufficiently be ensured by having the lower edge of the scales rest upon the disc 10.

Thus the scales being uniquely located with respect to the container and the container being mounted in a defined orientation, the scale readings will indicate directly the direction of incident radiation both in azimuth and altitude. The extent of subdivision of the scales is a matter of choice.

If the radiation direction finder is to record the incidence of radiant heat, the record surface may be sensitised by a chemical which changes colour on heating, such as the double iodides of mercury and silver, or by a dye mixed with a solvent which melts on heating. But since radiant heat suffers great absorption in the atmosphere a recording direction finder dependent on it will not be reliable over great distances. If the explosion is to be found by the light it emits the recording surface may be of paper or celluloid sensitised with silver bromide as for photographic purposes. In any case, if desired, the sensitising coating may be applied direct to the metal screen instead of to a separate sheet lining the screen. The scale or scales may be embossed, engraved or printed on the material which carries the sensitive emulsion whether it be paper, a plastic shell, or the sheet metal screen, or they may be on a separate transparency fitting the screen. These modifications apply also to the constructions hereinafter described.

The action of the recording direction finder will be apparent from FIG. 3. In the assembly of it the correct sensitised record screens are secured against the respective cylindrical segments 3–6; the blocked groove 18 and the cut-away part 17 ensure that the screen assembly is correctly inserted in the container; the marking 16 ensures that the container is correctly oriented upon its support. Assuming the north direction to be vertically downward in the drawing, then radiation coming from the east as indicated by the arrow a will enter the pinhole 6a and fall in the middle of the screen facing east, at the bearing 90°. But it will not enter any other pinhole, for, as indicated by a', it will be tangential at the adjacent pinholes. Radiation from the southeast, indicated by b and b' (shown parallel since the source is assumed to be distant compared with the diameter of the device) will enter both at 6a and 5a and make a record of bearing about 135° on each of two scales. Radiation from a somewhat more southerly direction, as indicated by c and c', will make a record on the screen facing south but fall beyond the boundary of the screen facing east.

If a linear scale is desired for altitude as well as azimuth the construction shown in FIG. 9 may be adopted. In lieu of the cylindrical segments 3–6 of FIG. 3 there are segments of spheres of which two, 23 and 25 appear in section in FIG. 9. Each is centred upon a pinhole 23a, 25a in the container 27. In this case the sensitised surfaces are shells of plastic 23b, 25b, which, after use, can be cleaned and re-sensitised.

A simpler form of recording direction finder dispenses with the separate screen assembly and uses the container itself as the support for the sensitised surface. The construction of FIG. 10 employs a cylindrical container 28 as does the construction of FIG. 1, but the sensitised record sheet 29 simply lines the container, being secured in place in an inturned edge 30 of the container or by circular spring clips as 31.

This construction is shown as having five pinholes, of which only 32, 33, 34 appear in the section; other numbers of pinholes may be used; what is essential is that the range in azimuth over which one admits radiation shall border on or preferably overlap the ranges of its neighbours.

In this arrangement light admitted from an azimuth range of, say, 90°, will impinge on the sensitised sheet 29 over an angle of 180° of the cylinder. The scales appurtenant to the several pinholes will therefore overlap, and if the pinholes were all alike and all on the same level as in FIG. 1 ambiguity could arise in the interpretation of the record. To obviate this the pinholes may be made of different shapes, as 32 triangular, 33 square, 34 round and so on, or otherwise made different, as by using a pair of holes instead of one. Or the holes may be placed at different levels so that the scales are one above the other. Both contrivances for eliminating ambiguity are illustrated in FIG. 10.

The construction of FIG. 10 will have a linear azimuth scale but not a linear altitude scale. If it is desired that the altitude scale shall be linear the construction of FIG. 11 may be adopted. Here the container 35 is spherical, built in two halves hinged together at 36. The sensitized record surface is upon a spherical shell of plastic 37, also built in two halves.

We claim:

1. A recording direction finder of flashes emitting bursts of radiant light and heat, comprising a screen sensitised to such radiation so as to be permanently marked thereby of which the horizontal cross section is a closed figure, a container opaque to such radiation having means for distinguishing its orientation, said container wholly enclosing said screen and having means for engaging said screen in a unique relative orientation in azimuth and being capable of being opened to allow access to said screen, said container having openings therein horizontally opposite said screen, spaced in azimuth around the container each admitting radiation to said screen over a limited angular range in azimuth overlapping the ranges of admission of neighbouring openings.

2. A recording direction finder of flashes emitting bursts of radiation, comprising a container of distinguishable orientation, opaque to such radiation, having openings therein spaced in azimuth around the container each admitting radiation over a limited angular range in azimuth overlapping the ranges of admission of neighbouring openings, and a sensitised screen wholly enclosed within said container and engaging therewith in a unique relative orientation in azimuth, made up of a number of parts of cylinders, the axes of which pass through the respective openings in the container.

3. A recording direction finder of flashes emitting bursts of radiation, comprising a container of distinguishable orientation, opaque to such radiation, having openings therein spaced in azimuth around the container each admitting radiation over a limited angular range in azimuth overlapping the ranges of admission of neighbouring openings, and a sensitised screen wholly enclosed within said container and engaging therewith in a unique relative orientation in azimuth made up of a number of parts of spheres the centres of which are at the respective openings in the container.

4. A recording direction finder of flashes emitting bursts of radiation, comprising an opaque cylinder adapted for mounting with its axis vertical and having means for indicating its position in azimuth, said cylinder having a removable part giving access to its interior and being wholly closed when said part is in position except for small openings spaced in azimuth around the cylinder, which, taken together, admit radiation from any direction in azimuth, and a radiation-sensitised surface lining the interior of said cylinder.

5. A recording direction finder of flashes emitting bursts of radiation, comprising an opaque sphere having means for indicating its position in azimuth, said sphere being made in separable parts allowing access to its interior, and having small openings spaced in azimuth around it which, taken together, admit radiation from any direction in azimuth, and a radiation-sensitised surface lining the interior of said sphere.

6. A recording direction finder as defined in claim 1 hereof, with the further feature that the screen bears graduations in azimuth indicative of the direction of arrival of radiation passing through an opening in the container and falling upon the screen.

7. A recording direction finder of flashes emitting bursts of radiant light and heat, comprising an upright hollow cylindrical sheet metal casing, having four perforations through its wall evenly spaced around it near its upper end and four grooved guideways on its inner surface midway between said perforations, one only of said guideways being grooved through a part only of its length, a domed plate closing the top of said casing and having an indication of direction upon it, a sheet metal disc adapted to close the lower end of said casing, four part-cylindrical screens secured to said disc with their concavities facing outward and their neighbouring straight edges joined, one pair only of said joined edges being cut back over part of its length, said joined edges entering the grooved guideways of the casing and the axes of said part cylinders lying in the wall of said casing and passing through the respective perforations therein, light-sensitised sheets graduated in azimuth lining said part cylinders, and means for securing said casing and disc to a fixed mounting with said indication of direction in a determined azimuthal setting.

8. A recording direction finder of flashes emitting bursts of radiant light and heat, comprising an upright hollow cylindrical sheet metal casing, having perforations through its wall evenly spaced around it near its upper end, each admitting light from an arc in azimuth, said arcs overlapping, grooved guideways on the inner surface of said casing midway between said perforations, one only of said guideways being grooved through a part only of its length, a domed plate closing the top of said casing and having an indication of direction upon it, a sheet metal disc adapted to close the lower end of said casing, part-cylindrical screens secured to said disc with their concavities facing outward and their neighbouring straight edges joined, one pair only of said joined edges being cut back over part of its length, said joined edges entering the grooved guideways of the casing and the axes of said part cylinders lying in the wall of said casing and passing through the respective perforations therein, light-sensitised sheets graduated in azimuth lining said part cylinders, and means for securing said casing and disc to a fixed mounting with said indication of direction in a determined azimuthal setting.

9. A recording direction finder of flashes emitting bursts of radiant light and heat, comprising a hollow sheet metal casing of circular cross section having four perforations through its wall evenly spaced around it near its upper end, the top of said casing being closed and having an indication of direction upon it, a sheet metal disc fixed within said casing, four concave screens secured to said disc with their concavities facing the respective perforations, said screens being surfaces of revolution about axes passing through the respective perforations, light-sensitised sheets graduated in azimuth lining said part cylinders, and means for securing said casing and disc to a fixed mounting with said indication of direction in a determined azimuthal setting.

References Cited by the Examiner

UNITED STATES PATENTS

| | | | |
|---|---|---|---|
| 2,472,879 | 6/49 | Bayle | 250—83 X |
| 2,544,261 | 3/51 | Gibson | 250—83 X |
| 2,562,969 | 8/51 | Teichmann | 250—83 X |
| 2,615,249 | 10/52 | Allard | 250—83 |
| 2,696,050 | 12/54 | Taylor | 250—83 |
| 2,705,757 | 4/55 | Shurcliff | 250—71 |

RALPH G. NILSON, *Primary Examiner.*

ELI J. SAX, IRVING L. SRAGOW, *Examiners.*